Feb. 28, 1928.
J. A. PROCTOR
ELECTRICAL CONDENSER
Filed Nov. 6, 1924
1,660,936
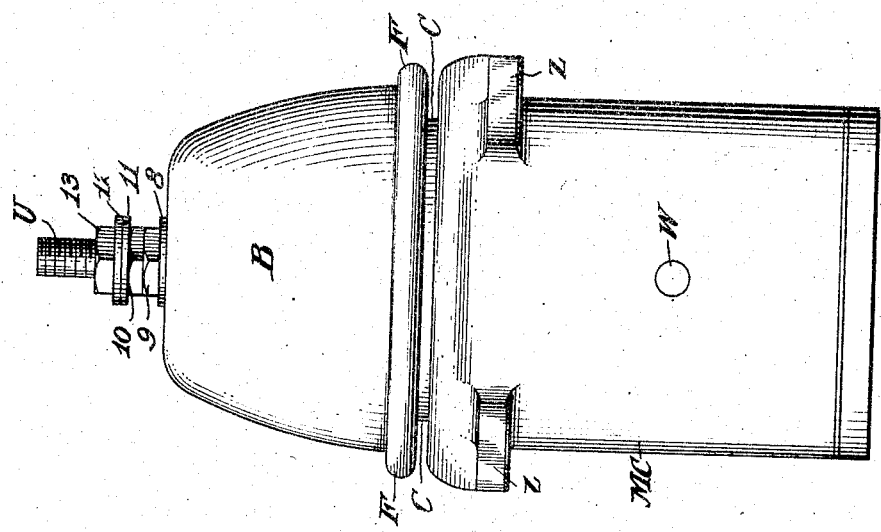
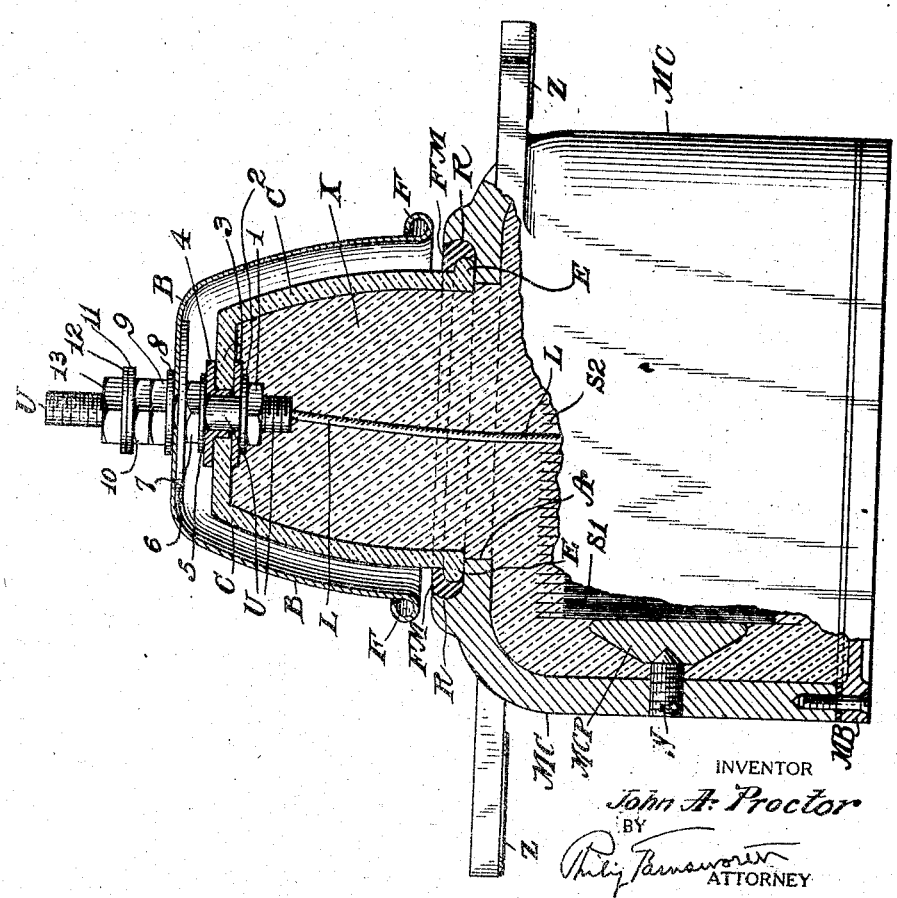
INVENTOR
John A. Proctor
BY
Philip Farnsworth
ATTORNEY Patented Feb. 28, 1928.

1,660,936

UNITED STATES PATENT OFFICE.

JOHN ALBERT PROCTOR, OF LEXINGTON, MASSACHUSETTS, ASSIGNOR TO WIRELESS SPECIALTY APPARATUS COMPANY, OF BOSTON, MASSACHUSETTS, A CORPORATION OF NEW YORK.

ELECTRICAL CONDENSER.

Application filed November 6, 1924. Serial No. 748,000.

This invention relates to improvements in electrical condensers or capacitors of the type involving high potential differences between different parts of the device, and more especially those operated at high frequencies as in radio communication.

Among the objects of the invention is that of reducing heating of high potential insulating material employed, and thereby preventing deterioration, breakdown and destruction of such insulation.

The invention consists of the arrangements which are illustrated in the drawings (which are about one-half scale) and described in the text, by way of example, in a present-day commercial high potential mica condenser, especially one adapted for high frequency service.

Figure 1 is a side elevation, partly in section, of a complete condenser embodying the invention; and Fig. 2 is a side elevation of the same.

My present invention may be used alternatively with that of my application Serial No. 680,121, filed December 12, 1923, but is preferable thereto, largely by reason of reduced cost, but also by way of improved operation.

The improvement hereof is on the type of condenser which includes a metal enclosing casing MC to which the condenser S¹, S² is grounded, the metal casing having an opening, shown at the top (Fig. 1) out through which extends the high potential lead L. In this type, there is frequently a potential difference of many thousands of volts between high potential lead L and peripheral wall A of the casing, opening for said lead, i. e., the part of the metal casing nearest said lead. The practical problems involved in the construction of such condensers relate largely to provisions for the proper insulation of the high potential lead from the metal casing to which the condenser is grounded, and provisions for reducing the heating of the insulating material used to separate the high potential lead from the metal casing.

The invention of my said prior application was an advance upon prior methods of insulating the grounded casing and high potential lead. The method just previously in use had involved the surrounding of the high potential lead with an insulating structure extending substantially from the condenser stack to a considerable distance outside of and beyond the casing, in general accord with patent to Priess, 1,596,374 but such insulating structure consisting of layers of mica sheets, and said built-up mica structure resulting in high heat losses liable to injure or destroy the structure itself. By use of the invention of my said prior application, I dispensed with all of said insulating structure, save only a mica disk (compare insulating member 18 of said Patent 1,596,374) serving as cover for the opening through the casing for the high potential lead.

By the present invention, I dispense with all insulating material (as 18 of Patent 1,596,374) liable to be harmfully heated and located directly across said casing opening between metal casing and high potential lead; and I dispense also with the metallic structure of my said prior invention which was located adjacent the mica disk cover.

The type of condenser on which the present invention is an improvement usually comprises a metal casing MC enclosing the stack of sheets of mica and metal foil, the stack being grounded to the metal casing, and the casing having a top opening for the passage of the high potential lead of the condenser. The type also usually has a static shield (as 24 of said Patent 1,596,374) co-operating with metal casing MC, located outside the casing and connected to the high potential terminal. This type of condenser also usually comprises an embedment X of paraffin wax or the like surrounding condenser stack S¹, S², and molded in the metal casing (in an inverted position) after the condenser stack is assembled in place inside the casing; and the casing may be provided with a bottom opening which, after the operation of wax filling, is closed permanently by a metal bottom MB screwed to the bottom of the side wall of the metal casing. The stack S¹, S² is held in place inside the casing, and between the end walls thereof, by clamping members MCP, one at each end of the condenser stack, and by screws W passing through the casing walls. The casing is usually oblong (Figs. 1 and 2) in general correspondence with the oblong stack which lies horizontally therein; but the casing may have other shapes, as circular, square or lozenge shape. The condenser stack may be of any suitable construction, but usually consists of mica sheets as dielectric and metal foil sheets as armatures; also preferably, for high potential working, the condenser stack consists of a plurality of sections connected in series. In the case shown, and preferably, the stack consists of two portions $S^1$, $S^2$, arranged end to end, and each comprising a plurality of serially-connected sections; and from the midpoint of such stack the high potential lead L is connected.

The structure of the present improvement is very simple, but its increased value over that of the invention of my said prior application is measured by its high economy in cost and its improved operating efficiency in reducing heat losses and the consequent permanence of the insulation between the grounded metal casing and the high potential lead.

The structure consists primarily of the inverted bowl-shaped cover C of insulating material as glass, and, secondarily, and in combination of the metal static shield B of shape corresponding to said bowl-shaped cover which is nested in protecting shield B. The rim of the inner bowl C rests on a ledge A at the peripheral wall of the lead-opening of the casing. A locking recess R is formed in the metal casing above said ledge A, and the radially extending flange E of the rim of bowl C is held permanently to casing MC by fusible metal or Portland cement or the like FM cast in said recess R, said recess being curved at its outer periphery shown for the purpose of retaining the hardened casting. Bowl C is preferably of glass, such as any form of oven-glass withstanding high temperatures without cracking, and I prefer to use the glass sold under the name "oven-glass" as an efficient material standing abrupt and unequal changes of temperature at several hundred degrees Fahrenheit. While the invention provides means for reducing heat losses very materially, yet the wax processing of the device involves such temperatures making desirable the use of high oven-glass exposed to the hot wax.

As shown in Fig. 1, the open end of bowl C is in full and free communication with the interior of casing MC, and closes the lead opening so that, after the bowl is secured in place and the entire structure inverted for wax filling from the bottom casing opening, the wax filler will fill the interior of the bowl around high potential lead L as the latter passes centrally through the wall of the bowl C. Thus no insulating material other than wax or the like is present directly across the top casing opening from wall to wall thereof. The only insulating material there present is the wax, which is not seriously injured by heating, although it is not as good a dielectric medium as air; the wax being employed in condensers of this type for the purpose of protecting the condenser stack from moisture.

The outer diameter of bowl C preferably and usually is substantially less than the longer inside diameter of the casing itself, being conveniently, in the instance of the oblong casing shown, a little less than the shorter width of the casing; and the embedding material X in the hollow interior of cover C, lies between all points of high potential lead L and the nearest portions of the metal casing, the bowl shape of cover C permitting the omission from between the casing and the high potential lead L of all insulating material liable to injury by high heating, as distinguished from the case of an insulating disk covering the top casing opening and lying in the path of shortest distance between the metal of the casing and the high potential lead. The inner diameter of bowl C at its rim, (which contains embedding material X at the location of shortest distance between casing and lead L), although usually smaller than the longer diameter of the casing, yet should be as large as convenient without unduly increasing need of excessive strength of the glass bowl. And the depth of the bowl may be considerable, for the purpose of increasing the leakage distance, without being so great as to increase unduly the over-all dimensions of the entire structure.

The static shield B is, according to this invention, made bowl-shaped to correspond with the bowl shape of glass cover C, being separated therefrom by air as a perfect dielectric. That is, the flat disk static shield 24 of said prior Patent 1,596,374 is modified to a bowl shape to adapt it to insulating bowl C. The rim of bowl B extends downwardly to within a desired distance of the metal of casing MC, and is there flared or rolled at F to prevent high tension brushing. Metal bowl B at its upper portion is electrically connected to the high potential terminal, and its lower proximity to metal casing MC serves to confine the lines of electrical stress largely to locations outside of glass bowl C, and cause such lines to exist in air dielectric, thereby preventing heating of any solid dielectric material. The intensity of the electrostatic field between casing MC and the high potential lead L and condenser terminal U is a function of the operating voltage and frequency. Condensers with the present improvement are adapted to withstand potentials of the order of fifty thousand volts at radio frequencies, without undue heating. This invention, by means of the bowl-shaped cover B over bowl C, permits omission from the most intense part of the electrostatic field, of all insulating material liable to be injured by heating; and the provision of metal bowl B outside of glass bowl C and approximating to metal casing MC, results further in directing the most intense field from passage through the insulating material of bowl C. Also, the use of oven-glass for the bowl-shaped cover C permits the use of voltages and frequencies, without injuring cover C, which may result in quite intense fields through cover C notwithstanding the provision of field-shunting bowl B. Thus the shape and location of cover C, the shape and location of shield B, and the material itself of cover C, all co-operate to the end of greatly increasing the upper limits of permissable operating voltage and frequencies. The bowl shape of parts B and C may be more or less shallow than as shown in Fig. 1, for different designs for varying conditions of service. This bowl shape, however, is of value in greatly increasing the creepage distance between the high potential lead and terminal and the points on metal casing MC which are nearest thereto; and the use of glass as the insulating material for bowl C provides a smooth surface reducing liability to flash over. Also the use of any kind of oven-glass for bowl C provides a surface which is less attacked by moisture and atmosphere than ordinary glass. Oven glass has a desirably low dielectric loss. Also the rim of bowl B may extend so close to the metal of casing MC, as shown as to provide a definite safety spark-gap, and in such case it provides the greatest extent of mechanical protection for the insulating material, as glass, of bowl C.

With the use of bowl C as distinguished from the use of a flat disk to close the lead opening of the casing, there is no direct line of creepage between casing and high potential lead, but, on the other hand, there is a very long creepage path measured by the depth of glass bowl C, between the metal casing to which the edge of bowl C is secured, and the closed end of the bowl C through which the high potential lead extends. In the case of the use of a built-up structure of mica sheets surrounding high potential lead L, it was considered necessary to guard against creepage by the provision of a staggered path up and down the insulating structure. The bowl shape of my cover C provides an equally long creepage path of much less structure cost.

Shield B for bowl C may be an upper extension of casing MC, in which case the spark-gap in the circuit will be located between the upper part of such shield and a radial extension from terminal U, instead of at the rim of B as shown.

The cost of production plainly is much less than that of the metal interior construction of my said prior application for patent, and very much less than the prior practice of surrounding the high potential lead with a built-up structure of mica sheets. The glass bowl C may be produced in large quantities at a very small cost per unit. In fact, the shape of glass bowl C is substantially the same as the domestic baking cups made of oven glass and now on sale, save that the top of bowl C (Fig. 1) is perforated to permit passage of the high potential terminal U; and it is quite practical to use such baking cups in my invention, but so perforated. In short, the bowl-shaped cover of this invention is a most economical as well as efficient substitute for the prior high potential insulators which consisted of the built-up insulating structures of the prior art, or of the mica disk cover of my said prior application for patent with its accompanying central metallic structures.

In the construction illustrated, bowl C serves as the support for the high potential terminal L and for the metal shield B. In this construction, the lead L, between the condenser stack and the top high potential terminal U, may be a flexible lead soldered at its bottom to the condenser stack and at its top to the lower end of metal stud or stalk U. Stud U extends from its lower end, soldered to lead L, to its upper end, through both bowls C and B, each of which has its closed end perforated for the purpose. Stud U is threaded throughout its length as a basis for assembly of the following parts beginning from the bottom. A hex nut 1 bears up against metal washer 2, which bears up against lower gasket 3, which bears up against the glass wall of bowl C. Gasket 3 may be of leather, lead or rubber to distribute the strains over the glass of bowl C and prevent cracking thereof by the high pressure of assembly. Upper gasket 4, of the T-shaped cross section shown, enters into the hole in bowl C and separates the inner wall of said hole from metal stud U; this gasket 4 also bearing against the top of the closed end of bowl C, and being of material like gasket 3 to distribute mechanical strains over the glass. Metal washer 5 is held down on gasket 4 by nut 6. Above nut 6 is a metal washer 7 of larger diameter which supports the upper flat part of shield B. Shield B is here perforated to permit passage of stud U. Above B is a washer 8 held down by nut 9. On top of nut 9 is a lock nut 10. On top of nut 10 are two washers 11 and 12 between which may be clamped the circuit lead, by means of a nut 13, on top of which may be a lock nut if desired to prevent backing off of nut 13 under vibration. The ease of assembly will be seen from the above.

The low potential lead for the circuit in which the condenser may be used may be attached to any desired part of metal casing MC, such as integral supporting-lugs Z.

In prior constructions, the rigidity of the high potential lead and terminal have been obtained by an extension of the stud U down to the condenser stack, and such high potential stud has been employed as a heat-conducting path, for the purpose of conducting heat to the outer atmosphere but incidentally contributing to the heating of the insulating structure surrounding such high potential stud. Here, however, the lead L from the condenser stack to the high potential terminal may be the flexible lead L shown, because the rigidity of the high potential terminal U is maintained by bowl C, the rim of which is supported on metal casing MC. It is not always advantageous to connect a rigid high potential lead to the condenser stack, and by this invention, therefore, it is permissible to use the more convenient lead in the form of the flexible cable L.

Another advantage of the bowl-shaped insulating cover C is that the shape of shield B and cover C may be assimilated to one another so that when cover C is located as shown inside of or nested with shield B, said shield serves to deflect the most intense field from the insulating material of which cover C is composed; that is, as distinguished from the case of a flat insulating disk closing the top of the lead-opening of the casing, here the shield B can be given the above useful function in connection with bowl cover C by giving to the shield a bowl-shape generally conforming to the shape of cover-bowl C. In the form shown, both insulating cover C and shield B have been altered in shape from prior designs, in order to conform to one another, which results not only in a shunting of the field from the material of cover C, but constitutes a much longer creepage path along the insulating material of the cover and between the high potential terminal U and metal casing MC, than in the prior case of an insulating disk cover.

The exigencies of heating by electrostatic fields, involved in the subject-matter hereof, is due largely to the small over-all volume of the high potential condenser in question, in connection with the disproportionately high potentials and alternating frequencies to which the device is subjected in service.

Of course, if desired, the side wall of glass bowl C may be corrugated to increase yet further the leakage path; but that is not usually necessary, as there is nothing to prevent increase of leakage path wherever desired, by simply increasing the depth of the bowl.

It is to be understood that the invention is not limited to the embodiments and features specifically shown and described herein, but that such embodiments and features are subject to changes and modifications without any departure from the spirit of the invention. Clearly, although the bowl-shaped members are preferably and usually of circular form, they may have any other desired section while yet retaining their substantial bowl shape.

I particularly point out and distinctly claim the part, improvement or combination which I claim as my invention or discovery, as follows:—

1. In a high potential electrical condenser of the type wherein the condenser is embedded in insulating material inside an enclosing casing of metal to which the condenser is grounded, the casing having an enclosable opening to permit filling the casing with the embedding material and the casing having an enclosable opening for the high potential condenser lead, a static shield of metal being connected to one terminal of the condenser and extending toward the other, the improvement which comprises a bowl-shaped member of insulating material as a cover for the lead-opening of the casing, and having an external diameter less than the internal diameter of the casing, and insulating cover being located inside and surrounded and protected by said shield and having its rim secured to the wall of the casing lead-opening and supporting said shield and secured to the high potential lead.

2. In a high potential electrical condenser of the type comprising an enclosing casing of metal to which the condenser therein is grounded, the condenser having an opening out through which extends the high potential condenser lead, and a static shield of metal electrically connected to one condenser terminal and extending toward the other, the improvement which comprises a bowl-shaped member of insulating material as a cover for said casing opening, said bowl-shaped cover surrounding the high potential lead and being surrounded by the static shield, said insulating cover having its rim secured to the wall of the lead opening of the casing.

3. In a high potential electrical condenser of the type wherein the condenser is enclosed by a casing of metal to which it is grounded, said casing having an opening for the high potential condenser lead, the improvement which comprises a bowl-shaped cover of insulating material for said opening, said casing around its said opening being constructed with a locking recess to receive the edge of said bowl, the latter having an outwardly projecting rim-flanged located in said casing recess, and the casing and bowl being secured together by a locking casting in said casing recess around said flange of the bowl.

4. In a high potential electrical condenser of the type wherein the condenser is enclosed by a casing of metal to which it is grounded, said casing having an opening for the high potential condenser lead, the improvement which comprises two generally bowl-shaped members nested together outside the casing, the outside bowl being a static shield of metal connected to one condenser-terminal extending proximate the other condenser-terminal and the inside bowl being of insulating material and having its rim secured to the wall of and closing the casing-opening and the outside static shield bowl providing mechanical protection for the insulating material of the inside bowl.

5. In an electrical condenser of the type wherein the condenser is enclosed by a casing of metal to which it is grounded, said casing having an opening for a condenser lead, the improvement which comprises a bowl-shaped cover of insulating material having a radially-projecting rim resting on the casing around said lead-opening and having a perforation through its closed end for the high potential condenser lead, the hollow interior of the bowl having free communication with the interior of the casing; the radially-projecting rim of the bowl being secured to the casing by a locking casting in the casing; and the closed perforated portion of the bowl being separated by a yielding gasket from the condenser lead.

6. In an electrical condenser, the combination with an enclosing casing of metal having an opening for a terminal-lead of the condenser, of two substantially bowl-shaped members nested together outside the casing and having their cavities facing the casing; the outer bowl being of metal and the inner bowl of insulating material; the rim of the inner bowl being secured to the casing around the terminal-lead-opening thereof and closing said opening; the outer bowl being electrically connected to the terminal-lead and extending over the inner bowl and proximate the casing; the inner bowl being perforated to permit passage of the terminal-lead to the outer bowl; the outer bowl being mechanically supported by the inner bowl; and the inner bowl being mechanically secured to the terminal-lead.

7. In a high potential condenser of the type wherein a casing of metal surrounds the condenser itself and is connected to the contained condenser as a terminal thereof, said casing having an outlet opening for a projecting terminal-lead of the condenser, the improvement comprising two generally bowl-shaped members nested together and surrounding the projecting terminal lead outside the casing; the inner bowl being of insulating material, closing said opening and having its rim secured to the portion of the casing which surrounds said opening; said inner bowl having its open end facing the interior of the casing and its other end perforated to permit passage of the projecting terminal-lead to the outer bowl; the insulating material of the inner bowl lying substantially outside the space of shortest distance between the metal casing and the projecting terminal-lead; and the outer bowl being of metal, electrically connected to the projecting terminal-lead and extending toward but not electrically connected with the metal of the casing and thereby providing electrostatic and mechanical protection for the insulating material of the inner bowl.

8. In a high potential condenser of the type wherein the condenser itself is enclosed by a casing of metal interiorly spaced from the condenser and having an opening for a projecting terminal-lead of the enclosed condenser, the space between casing and condenser being filled with an embedding insulating material which is hot and fluid when introduced, the improvement in insulating the casing from the projecting terminal lead which consists of a generally bowl-shaped cover closing the casing opening, located outside the casing but having its cavity facing and in communication with said interior casing-space; said opening and cover having diameters which are short relative to the superficial dimensions of the corresponding face of the casing; and said cover being perforated to permit passage of the projecting terminal-lead and consisting of electrically insulating oven-glass withstanding the heat of the initially fluid embedment.

JOHN ALBERT PROCTOR.